United States Patent Office 3,427,345
Patented Feb. 11, 1969

3,427,345
LONG-CHAIN BISPHENOL ESTERS
Reynold E. Holmen, White Bear Lake, Minn., assignor to Minnesota Mining and Manufacturing Company, St. Paul, Minn., a corporation of Delaware
No Drawing. Continuation-in-part of application Ser. No. 194,987, May 15, 1962. This application Sept. 20, 1965, Ser. No. 488,722
U.S. Cl. 260—473      3 Claims
Int. Cl. C07c 69/76

ABSTRACT OF THE DISCLOSURE

Long-chain bisphenol esters having utility as antioxidants, plasticizers, germicides and fungicides and characterized by surprisingly good compatibility with oleophilic materials. These bisphenol esters are typified by the formula

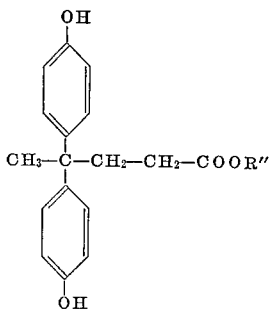

where R" is an alkyl group of at least 8 carbon atoms.

---

This application is a continuation-in-part of my copending patent application S.N. 194,987, filed May 15, 1962, now abandoned, which in turn was a continuation-in-part of my application S.N. 502,742, filed Apr. 20, 1955.

The present invention relates to a useful class of bisphenol esters.

One precursor of the novel bisphenol esters is gamma,gamma-bis (4-hydroxyphenyl)valeric acid, also known as 4,4-bis(4-hydroxyphenyl)pentanoic acid, which is presently marketed in commerce as DPA. I understand that the commercial product is obtained by reacting levulinic acid with phenol. Because levulinic acid melts at 33.5° C., it is difficult to handle in commerce, and it is corrosive.

Esters of DPA may be produced directly from levulinic acid esters which are non-corrosive, free-flowing liquids that are easy to transport and store. As compared to levulinic acid, its lower alkyl esters are at least as economical to use as starting materials, being more easily extracted from aqueous media because of lower water solubility and being more readily distillable. The process of reacting oxocarboxylic acid esters such as these levulinic esters with phenol proceeds easily, with good yield. As compared to 4,4-bis(4-hydroxyphenyl)pentanoic acid, the diphenolic lower alkyl esters which are obtained directly from levulinic esters are much more easily purified because they are readily distillable under reduced pressure. The bisphenol esters of the present invention may be produced from the diphenolic lower alkyl esters, or the diphenolic acid may be esterified with the appropriate alcohol.

In short, the bisphenol esters of the present invention have the formula

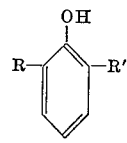

wherein R" is an alkyl group having at least 8 carbon atoms, $n$ is an integer of 2 to 4, and Ar is the residual radical of a phenol selected from the group consisting of resorcinal, alpha-naphthol and phenols of the structure

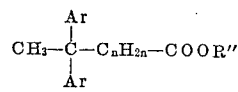

wherein R and R' are each selected from the class consisting of hydrogen and lower alkyl groups and should together include a total of not more than about 8 carbon atoms, since phenols with a larger total number of alkyl carbon atoms react unsatisfactorily with the oxocarboxylic acid ester. While levulinic acid (or preferably a lower alkyl ester thereof) is a preferred starting material, in which case $n$ in the above formula is 2, geronic acid, mesitonic acid and deltaketocaproic acid are also useful starting oxocarboxylic acids.

The starting oxocarboxylic acid ester is preferably the ester of a primary alcohol, the alkyl group of which does not have more than about 6 carbon atoms so that reaction with the phenol proceeds in reasonably good yield. Especially preferred as starting materials are methyl levulinate (B.P. 196° C.) and ethyl levulinate (B.P. 205° C.) because of the ease with which they react with the phenols and because of the east with which the diphenolic ester products can be purified. Among other convenient starting materials are isopropyl levulinate (B.P. 209° C.), n-propyl levulinate (B.P. 221° C.), n-butyl levulinate (B.P. 238° C.), and isobutyl levulinate (B.P. 231° C.).

To facilitate the reaction between the oxocarboxylic acid ester and a phenol, it is preferred that the reaction mixture also include about 5 mol percent or more of the same alkyl alcohol that provides the alkyl ester of the oxocarboxylic acid. The reaction mixture should also contain an acid catalyst of the type known to produce bisphenolic substituted reaction products between phenols and ketones. Anhydrous hydrogen chloride is especially preferred. Alternatively, sulfuric acid catalyst (80% or lower concentration, preferably diluted by the alkyl alcohol that provides the alkyl ester of the oxocarboxylic acid) may be employed at room temperature. The use of more highly concentrated sulfuric acid requires lower temperatures to avoid excessive sulfonation when a sensitive phenol is employed. Shorter reaction times are sometimes possible with sulfuric acid, but hydrogen chloride is more conveniently removed after completion of the reaction.

EXAMPLE 1

Ethyl ester of 4,4-bis(4-hydroxyphenyl)pentanoic acid

A solution of ethyl levulinate (36.05 grams), phenol (94 grams) and mercaptoacetic acid (5 drops) in absolute ethanol (46 grams) was saturated with dry hydrogen chloride. After this had stood about 36 hours at room temperature, a 7.5 gram sample was withdrawn and distilled under vacuum up to a bath temperature of 150° C.

at 0.3 mm. Hg. The solid residue was dissolved in ethanol. Some water was added and the solvent slowly evaporated from the solution. The ethyl ester of 4,4-bis(4-hydroxyphenyl)pentanoic acid crystallized in stubby colorless prisms (M.P. 126–128° C.). Similar treatment of the balance of the reaction mixture several days after resaturating with dry hydrogen chloride gave a total yield of 30 grams more of the ethyl ester. Another sample was crystallized from ethyl acetate-petroleum ether and melted at 127.5–128.5° C.

*Analysis.*—Calculated for $C_{19}H_{22}O_4$: C, 72.6; H, 7.0. Found: C, 72.4; H, 7.1.

Mercaptoacetic acid is one of a number of sulfur compounds which may be utilized to speed up the reaction of a phenol with an alkyl ester of oxocarboxylic acid in the practice of my invention. Other compounds with which it may be replaced include hydrogen sulfide and mercaptopropionic acid. The reaction will proceed without the use of auxiliary catalysts but often at a slower rate.

EXAMPLE 2

Ethyl ester of 4,4-bis(3,5-diisopropyl-4-hydroxyphenyl)pentanoic acid

To 17.8 grams (0.1 mol) of 2,6-diisopropylphenol, 5.77 grams (0.04 mol) of ethyl levulinate and 4.6 grams (0.01 mol) of absolute ethanol in a 250 ml. Erlenmeyer flask at 0° C. was added enough dry hydrogen chloride to saturate the solution. The stoppered flask was allowed to stand at room temperature for one week, after which the contents were poured onto an excess of cracked ice and allowed to stand in air at about 10° C. for 24 hours. The resulting solid was collected by filtration and purified by recrystallization from aqueous ethanol. Two crops provided a total yield of 66% of the product ethyl ester of 4,4 - bis(3,5-diisopropyl-4-hydroxyphenyl)pentanoic acid. A sample again recrystallized from aqueous ethanol and dried in a drying pistol at 100° C. under 0.1 mm. Hg pressure melted at 134.5–136° C.

*Analysis.*—Calculated for $C_{31}H_{46}O_4$: C, 77.13; H, 9.61. Found: C, 77.1; H, 9.6.

The infrared absorption spectrum of the product ester was consistent with that postulated for the formula compound.

EXAMPLE 3

Methyl ester of 9-methyl-3,4,5,6-dibenzoxanthene-9-propionic acid

A solution of alpha-naphthol (57.6 grams), methyl levulinate (26 grams), and methanol (32 grams) in a 250 ml. Erlenmeyer flask was saturated with dry hydrogen chloride, and the stoppered flask was allowed to stand at room temperature. In less than 4 days the reaction mixture had developed a highly viscous lower layer under a supernatant layer largely comprised of methanol. After a total of 13 days, the methanol layer was decanted, and the viscous layer was dissolved in a mixture of diethyl ether and benzene, washed thoroughly with aqueous sodium bicarbonate solution, dried over anhydrous sodium sulfate, and filtered. Solvent was removed from the filtrate on a steam bath under a current of air, and the residue was diluted with about 100 ml. of methanol. Acetone was added to complete solution, and water was carefully added to the point of cloudiness. A first crop of nearly colorless crystals was recovered in the amount of 26 grams by filtration on a Buchner funnel. The granular crystals melted at 106–109° C. followed by resolidification and finally remelted by 145–147° C. Recrystallization from methanol-acetone yielded lustrous colorless needles melting at 145°–147° C. The melting point was not depressed when run on a mixture of this ester and that prepared by methanol esterification of the 9-methyl-3,4,5,6-dibenzoxanthene-9-propionic acid product of Example VIII of my application S.N. 502,742 (also Example VIII of my U.S. Patent No. 2,984,685).

The product ester of the present example, which appeared to be dimorphic, is thought to have the following structure:

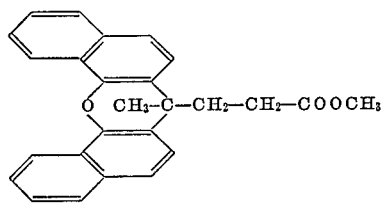

In this case, a molecule of water was lost from the bisphenolic intermediate, with the resulting formation of an ether linkage.

*Analysis.*—Calculated for $C_{26}H_{22}O_3$: C, 81.65; H, 5.8. Found: C, 82.1; H, 6.2.

EXAMPLE 4

Methyl ester of 4,4-bis(4-hydroxy-3-methylphenyl) pentanoic acid

To freshly distilled o-cresol (26 grams) was added 13 grams of methyl levulinate and 5 ml. of methanol. The solution was stirred and saturated with dry hydrogen chloride, resaturated three days later, and allowed to stand in a stoppered flask at room temperature for a total of seven days. The reaction mixture was poured over cracked ice, and the product compound was isolated by a procedure similar to Example 2, with recrystallization from aqueous methanol. The colorless crystals of the methyl ester of 4,4-bis(4-hydroxy-3-methylphenyl)pentanoic acid melted at 132–134° C.

EXAMPLE 5

Ethyl ester of 4,4-bis(4-hydroxy-3-methylphenyl) pentanoic acid

Crystals of this ester, obtained from ethyl levulinate and o-cresol by the process of Example 2, had a melting point of 142–144° C. The melting point was severely depressed when run on a mixture of this ester and 4,4-bis(4-hydroxy-3-methylphenyl)pentanoic acid.

EXAMPLE 6 n-Butyl ester of 4,4-bis(4-hydroxyphenyl) pentanoic acid

By a process essentially as in Example 4, approximately 0.1 mol of n-butyl levulinate containing a small amount of n-butanol, 0.3 mol of phenol, 2 drops concentrated sulfuric acid were mixed and saturated with dry hydrogen chloride and again 3 days later, at which time 5 drops of mercaptoacetic acid was added. After a total of 5 days, the reaction mixture was poured over cracked ice. After the ice melted, the aqueous layer was poured off, and the viscous residue was taken up in diethyl ether, washed with aqueous sodium bicarbonate, dried over anhydrous sodium sulfate, and filtered. The diethyl ether was removed on a steam bath. The residue was heated in an oil bath at 110° C. under 0.5 mm. Hg for 1.5 hours. The viscous amber product in the amount of 14.4 grams comprised the n-butyl ester of 4,4-bis(4-hydroxyphenyl)pentanoic acid.

A portion of this ester was heated using an oil bath at 150° C. at pressures from 1 mm. to 0.1 mm. for about two hours to provide a more pure sample which had a refractive index ($n_D^{26}$) of 1.571 and was a fracturable glass. This value agrees satisfactorily with that for the n-butyl ester prepared from 4,4-bis(4-hydroxyphenyl)pentanoic acid which had been identified by infrared analysis, carbon and hydrogen analysis, and molecular weight.

Fine colorless needles of the n-butyl ester of 4,4-bis(4-hydroxyphenyl)pentanoic acid melted at 97–100° C. on a thermometer bulb.

The crystalline methyl ester of 4,4-bis(4-hydroxy-3,5-diisopropylphenyl)pentanoic acid was found to have a melting point of 109–110° C.

Among other phenols which condense with lower alkyl esters of levulinic acid are 2,6-dimethylphenol, 2,6-diethylphenol and resorcinol. Because of the tendency for resorcinol to react at more than one position on the ring, it may provide products more complex than those obtained from phenol, as suggested in Example VII of my application Serial No. 502,742.

EXAMPLE 7

Condensation product of resorcinol and methyl levulinate

Methyl levulinate (13 grams) and resorcinol (22 grams) were mixed in a 125 ml. Erlenmeyer flask while warming slowly to about 70° C. to dissolve the bulk of the resorcinol. Three drops of mercaptoacetic acid were added while the reaction mixture was stirred and allowed to cool. Crystals of resorcinol appeared to be reprecipitating. Heat was reapplied to about 55° C., and 3 drops of concentrated hydrochloric acid were added. A slight exotherm was observable and the light amber reaction mixture deepened to a reddish amber color. One drop of thiophenol catalyst was added and the flask contents were swirled. The clear, red-amber reaction mixture no longer showed a tendency to reprecipitate resorcinol as it cooled, even though seed crystals were abundant on the walls of the flask at all times. After reheating slowly to 70° C., the reaction mixture was corked and set aside.

Four days later the reaction mixture was very viscous and red-amber in color with no precipitation of resorcinol.

One-half of this crude product (about 15.5 grams) was dissolved in ethanol prior to adding water to reprecipitate the resinous product. The aqueous layer was decanted, the resin once more dissolved in ethanol, precipitated from water, the aqueous layer decanted, and the resinous residue was washed further with water prior to being dried for 6 hours in a 100° C. oven. On cooling the viscous resin set to a glassy, light amber solid. Approximately one gram of this purified product was removed and dried at 150° C. for analytical determinations. Infrared analysis indicated an ester of a diphenolic type material, confirming condensation between the resorcinol and the methyl levulinate. Hydroxyl content of the condensate was 9.6 percent.

An additional 1.60 grams of the purified product was dried at 150° C. to a final weight of 1.55 grams and to this was added 1.2 grams of paraformaldehyde and 5.0 ml. of isobutyl alcohol. This charge in a capped 4-ounce square bottle was warmed on the steam bath for 50 minutes. A slightly cloudy solution resulted. A small portion of this solution was poured into an aluminum dish and dried in a 100° C. oven for 30 minutes, after which the dish was placed on a 150° C. block which caused further fusion and evolution of some volatiles and gelation in about 3 minutes. This thermosetting product would be useful in adhesives or protective coatings.

To the remainder of the solution in the square bottle was added 2 drops of triethanolamine. The pH was about 6–7 using indicator paper moistened with water. The bottle was placed on the steam bath 35 minutes, at which time the clear dark amber-brown solution was removed, reacidified with a small amount of oxalic acid and replaced on the steam bath for another 30 minutes. A small portion was poured into an aluminum dish which was placed on a 150° C. aluminum block. The resulting film of resin product cured to an ethanol-insoluble film in 5 minutes.

The following example illustrates the alcoholysis of lower alkyl esters of diphenolic acids using longer chain alkyl alcohols such as octyl alcohol, dodecyl alcohol, octadecyl alcohol, montanyl alcohol or myricyl alcohol.

EXAMPLE 8

The ethyl ester of 4,4-bis(3,5-diisopropyl-4-hydroxyphenyl)pentanoic acid (0.03 mol) was alcoholyzed with 2-ethylhexanol (0.031 mol) in the presence of para-toluenesulfonic acid (0.095 gram) by heating for approximately 3 hours at an oil bath temperature of 110° C. During this time ethanol distilled from the reaction mixture. The cooled reaction mixture was diluted with diethyl ether, washed with aqueous potassium carbonate and with water, dried over anhydrous sodium sulfate, filtered, then concentrated on the steam bath. After further heating by an oil bath up to 130° C. under 0.5 to 1 mm. pressure, there was obtained 15.3 grams of viscous amber product comprising 2-ethylhexyl ester of 4,4-bis (3,5-diisopropyl-4-hydroxyphenyl)pentanoic acid. Refractive index was 1.523 ($n_D^{25}$).

*Analysis.*—Calculated for $C_{37}H_{58}O_4$: C, 78.4; H, 10.32. Found: C, 78.5; H, 10.4.

This initially viscous ester slowly crystallized in the form of waxy crystals melting at about 54° C., with prior sintering, as determined on a thermometer bulb.

In another instance, a crude product comprising the stearyl ester of 4,4-bis(4-hydroxyphenyl)pentanoic acid was converted to an insoluble resin by reacting it in acetic acid solution with an excess of aqueous formaldehyde using a trace of hydrochloric acid as a catalyst. The solution was warmed to reflux, then evaporated at elevated temperature to give a hard, insoluble resin having low surface adhesion properties. Such low adhesion properties, which may be utilized in backsizes for pressure sensitive adhesive tapes, are generally manifested by the formaldehyde condensates of bisphenolic esters of alkyl alcohols having an alkyl chain length of at least 12 or more carbon atoms.

EXAMPLE 9

The methyl ester product of Example 3 was refluxed with an excess of hydrazine hydrate in a mixture of methanol and ethanol for about 45 minutes after the methyl ester dissolved. From the cooled solution to which a small amount of water was added, there crystallized the hydrazide of 9-methyl-3,4,5,6-dibenzoxanthene - 9 - propionic acid; melting point 182–183.5° C. with some prior sintering.

*Analysis.*—Calculated for $C_{25}H_{22}O_2N_2$: N, 7.32. Found: N, 7.3.

The 4,4-bis(4 - hydroxy-3,5 - diisopropylphenyl)pentanoic acid hydrazide (melting point 148–150° C.) and the 4,4-bis(4-hydroxy-3-methylphenyl)pentanoic acid hydrazide (melting point 206–207.5° C.) were prepared in analogous manner.

The bisphenolic ester products obtained from phenol (monohydroxybenzene) and levulinic esters are readily condensed with aldehydes such as formaldehyde to form highly cross-linked polymeric resinous products. Anologous bisphenolic esters obtained from phenols having an alkyl substituent in a position ortho to the hydroxyl radical form linear rather than cross-linked polymers by condensation with aldehydes. These linear polymers may then be cross-linked by further reaction at the ester group, e.g., by reaction with a polyalcohol, a polyamine or an alkanol amine.

The monoester products of my invention may also be reacted with epichlorhydrin.

The bisphenolic ester products of my invention and products obtained therefrom may be utilized in a variety of ways such as for antioxidants, germicides and fungicides, agricultural chemicals (growth regulators), plasticizers, lubricants, low adhesion backsizes, coupling agents, casting and molding resins and as intermediates in the production of polyfunctional epoxy compounds and internally plasticized phenol-aldehyde resins. The esters are also valuable intermediates for the preparation of paper and textile treating materials. The initial condensates with formaldehyde as well as derivatives of the ester function provide points of attachment to the fiber. Halogenation and nitration of products of this invention may be carried out to enhance certain types of activity such as fungicidal, bactericidal, and herbicidal functions.

The diphenolic hydrazides prepared by a procedure as illustrated in Example 9 are useful curing agents for polyepoxides.

Although 4,4-bis(3,5-diisopropyl-4-hydroxyphenyl)-pentanoic acid is an effective antioxidant for oxidizable hydrocarbon material, e.g., elastomer based on butadiene, the higher alkyl esters (those of 8 carbons or more in the alkyl radical) are particularly valuable in such use because of much greater compatibility with oleophilic materials, particularly polymeric olefins such as polypropylene or polybutadiene. The much greater compatibility of the higher alkyl esters over that of the lower alkyl esters is strikingly illustrated by the following example.

EXAMPLE 10

To 0.4 gram of "Parowax" paraffin[1] in a test tube was added 0.04 gram of 2-ethylhexyl ester of 4,4-bis(3,5-diisopropyl-4-hydroxyphenyl)pentanoic acid with warming on an aluminum block maintained at 100–103° C. The cloud point of this mixture (1 part by weight of the ester to 10 parts by weight of the paraffin) was about 80° C., above which temperature the solution was clear.

For comparison, 0.02 gram of the ethyl ester of 4,4-bis(3,5-diisopropyl-4-hydroxyphenyl)pentanoic acid was added to 1.2 grams of paraffin in a test tube. When warmed in an aluminum block maintained at 100–103° C., the mixture (1 part by weight of the ester to 60 parts by weight of paraffin) was not totally miscible. Two increments of 0.2 gram each of paraffin were added but failed to achieve complete miscibility. With an additional 0.4 gram of paraffin, a perfectly clear solution was obtained at about 112° C. This clouded when the temperature was dropped to 75–80° C. and did not completely reclear when rewarmed to 90° C. even though only one part of the ethyl ester was now present per 100 parts paraffin. This vividly illustrates the much better compatibility with oleophilic materials (and correspondingly improved utility as antioxidants) of higher alkyl esters of the bisphenol compounds as compared to the lower alkyl esters.

I claim:
1. A compound having the formula

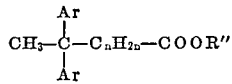

wherein R″ is an alkyl group having at least 8 carbon atoms, $n$ is an integer of 2 to 4, and Ar is the residual

[1] Melting point about 55° C.

radical of a phenol selected from the group consisting of resorcinol, alpha-napththol and phenols of the structure

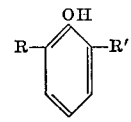

wherein R and R′ are each selected from the class consisting of hydrogen and lower alkyl groups and together include a total of not more than 8 carbon atoms.

2. A compound having the structural formula

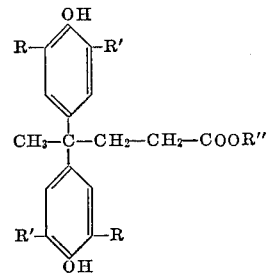

wherein R and R′ are each selected from the class consisting of hydrogen and lower alkyl groups and together include a total of not more than 8 carbon atoms, and R″ is an alkyl group of at least 8 carbon atoms.

3. The stearyl ester of 4,4-bis(4-hydroxyphenyl)pentanoic acid.

References Cited

UNITED STATES PATENTS

| | | | |
|---|---|---|---|
| 2,933,520 | 4/1960 | Bader | 260—473 |
| 2,780,588 | 2/1957 | Dunlop | 260—528 X |
| 2,917,537 | 12/1959 | Haury | 260—483 |

OTHER REFERENCES

Hickinbottom: "Reactions of Organic Compounds," (London, 1948), pp. 266–267.
Karrer: "Organic Chemistry" (1950) p. 267.
Sah et al.: "Levulinic Acid and Its Esters," J.A.C.S., vol. 52 (1930), pp. 4880–4883.

LORRAINE A. WEINBERGER, *Primary Examiner.*

D. S. STENZEL, *Assistant Examiner.*

U.S. Cl. X.R.

260—483, 345.3, 559, 999